(12) United States Patent
Fujimoto et al.

(10) Patent No.: US 9,884,600 B2
(45) Date of Patent: Feb. 6, 2018

(54) VEHICLE FRONT PORTION STRUCTURE

(71) Applicant: Toyota Jidosha Kabushiki Kaisha, Toyota-shi (JP)

(72) Inventors: Akihide Fujimoto, Toyota (JP); Kenichi Hiramatsu, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/205,117

(22) Filed: Jul. 8, 2016

(65) Prior Publication Data

US 2017/0088076 A1 Mar. 30, 2017

(30) Foreign Application Priority Data

Sep. 28, 2015 (JP) .................. 2015-190160

(51) Int. Cl.
*B60R 19/44* (2006.01)
*B60R 19/34* (2006.01)
*B60R 19/24* (2006.01)
*B60R 19/04* (2006.01)
*B62D 25/08* (2006.01)
*B60R 19/12* (2006.01)
*B60R 19/26* (2006.01)

(52) U.S. Cl.
CPC .............. *B60R 19/44* (2013.01); *B60R 19/04* (2013.01); *B60R 19/12* (2013.01); *B60R 19/34* (2013.01); *B62D 25/08* (2013.01); *B60R 2019/262* (2013.01)

(58) Field of Classification Search
CPC ......... B60R 19/34; B60R 19/44; B60R 19/52; B60R 2019/247; B60R 19/04; B60R 19/12; B62D 25/08

USPC ................ 293/115, 117, 133, 142–144, 155; 296/187.11
See application file for complete search history.

(56) References Cited

U.S. PATENT DOCUMENTS 5,215,343 A * 6/1993 Fortune ................... B60R 19/52
293/115
5,277,465 A * 1/1994 Weir ....................... B60R 19/52
280/762

(Continued)

FOREIGN PATENT DOCUMENTS

CA 2209576 A1 7/1996
DE 295 00 106 U1 5/1996

(Continued)

*Primary Examiner* — Gregory Blankenship
(74) *Attorney, Agent, or Firm* — Oblon, McClelland, Maier & Neustadt, L.L.P.

(57) ABSTRACT

A vehicle front portion structure includes a front side member, a bumper portion, a bumper guard and an up-and-down extension portion. The front side member extends in a vehicle front-and-rear direction. The bumper portion is provided at the vehicle front side of the front side member and extends in the vehicle width direction. The bumper guard is formed in a pipe shape, and is provided at the vehicle upper side of the bumper portion. The up-and-down extension portion extends in a vehicle up-and-down direction. A lower portion of the up-and-down extension portion is joined to the bumper portion and is attached to the front side member via a crush box. An upper portion of the up-and-down extension portion protrudes upward of the bumper portion and is connected to the bumper guard.

9 Claims, 7 Drawing Sheets

(56) References Cited

U.S. PATENT DOCUMENTS

| | | | | |
|---|---|---|---|---|
| 5,695,228 A * | 12/1997 | Storer | B60R 19/52 | 29/460 |
| 6,113,164 A * | 9/2000 | Setina | B60R 19/54 | 293/115 |
| 6,224,120 B1 * | 5/2001 | Eipper | B60R 19/40 | 293/115 |
| 6,231,093 B1 | 5/2001 | Storer | | |
| 6,290,271 B1 * | 9/2001 | Geisler | B60R 19/52 | 293/115 |
| 6,979,016 B1 * | 12/2005 | Wegener | B60D 3/00 | 280/495 |
| 8,608,231 B1 * | 12/2013 | Mendivil | B60R 19/34 | 293/133 |
| 9,004,576 B2 * | 4/2015 | Sakakibara | B62D 25/085 | 293/133 |
| 9,481,334 B1 * | 11/2016 | Matsumoto | B60R 19/34 | |
| 2001/0015559 A1 * | 8/2001 | Storer | B60R 19/52 | 293/115 |
| 2004/0135385 A1 * | 7/2004 | Murray | B60R 19/44 | 293/142 |
| 2005/0275194 A1 | 12/2005 | Wegener | | |
| 2006/0181088 A1 * | 8/2006 | Cobble | B60R 19/52 | 293/115 |
| 2006/0279096 A1 * | 12/2006 | Helms | B60R 19/52 | 293/115 |
| 2009/0218833 A1 * | 9/2009 | Rosemeyer | B60R 19/52 | 293/115 |
| 2011/0006553 A1 * | 1/2011 | Fretz | B60R 19/48 | 293/115 |
| 2013/0187395 A1 * | 7/2013 | Hanson | B60R 19/52 | 293/115 |
| 2014/0008924 A1 * | 1/2014 | Han | B60R 19/18 | 293/133 |
| 2014/0306469 A1 * | 10/2014 | Dreyer | B60R 19/52 | 293/115 |
| 2014/0339837 A1 * | 11/2014 | Hermann, III | B66D 1/00 | 293/115 |
| 2015/0021937 A1 * | 1/2015 | Perez | B60Q 1/0005 | 293/115 |
| 2016/0059810 A1 * | 3/2016 | Watanabe | B60R 19/24 | 293/133 |
| 2016/0318552 A1 * | 11/2016 | Matsumoto | B62D 25/08 | |

FOREIGN PATENT DOCUMENTS

| | | | | |
|---|---|---|---|---|
| JP | 08-164806 A | | 6/1996 | |
| JP | 9-290699 | | 11/1997 | |
| JP | 2015-63243 | * | 4/2015 | B60R 19/44 |

* cited by examiner

VEHICLE FRONT PORTION STRUCTURE

CROSS-REFERENCE TO RELATED APPLICATION

This application claims priority under 35 USC 119 from Japanese Patent Application No. 2015-190160 filed Sep. 28, 2015, the disclosure of which is incorporated by reference herein.

BACKGROUND

Technical Field

The present invention relates to a vehicle front portion structure.

Related Art

Japanese Patent Application Laid-Open (JP-A) No. 2015-63243 discloses a vehicle front portion structure in which a bumper portion at which a bumper guard is provided is attached to a vehicle front side.

In the structure according to JP-A No. 2015-63243, the bumper guard includes a protruding portion that protrudes upward of the bumper portion, the protruding portion is joined to an upper face of the bumper portion, and a rear face of the bumper portion is attached to a front side member via a crush box.

In this structure, a joining stiffness between the bumper guard and the bumper portion is weak. Therefore, if the vehicle vibrates up and down in accordance with running, the protruding portion of the bumper guard vibrates in the front-and-rear direction relative to the bumper portion. As a result, the bumper portion attached to the front side member is subject to tilting in the front-and-rear direction, and a bending moment is produced at an attachment portion to the front side member. Consequently, durability of the attachment portion to the front side member of the bumper portion is reduced.

SUMMARY

The present invention provides a vehicle front portion structure that may improve durability of an attachment portion to a vehicle of a bumper portion at which a bumper guard is provided.

A vehicle front portion structure according to a first aspect of the present invention includes: a front side member that extends in a vehicle front-and-rear direction; a bumper portion that is provided at the vehicle front side of the front side member and extends in the vehicle width direction; a bumper guard that is formed in a pipe shape, and that is provided at the vehicle upper side of the bumper portion; and an up-and-down extension portion that extends in a vehicle up-and-down direction, a lower portion of the up-and-down extension portion being joined to the bumper portion and being attached to the front side member via a crush box, and an upper portion of the up-and-down extension portion protruding upward of the bumper portion and being connected to the bumper guard.

According to the first aspect, the lower portion of the up-and-down extension portion is attached to the front side member via the crush box. Therefore, when the vehicle vibrates up and down in accordance with running, the vibrations are inputted from the front side member to the up-and-down extension portion via the crush box. The upper portion of the up-and-down extension portion protrudes upward of the bumper portion, and the bumper guard is connected to the upper portion.

Thus, the up-and-down extension portion includes a protruding portion that protrudes upward of the bumper portion and an attachment portion to the front side member, and the protruding portion and the attachment portion are made integral. Therefore, even when up-and-down vibrations are inputted to the up-and-down extension portion in accordance with running of the vehicle, vibrations of the protruding portion in the front-and-rear direction relative to the attachment portion are suppressed.

As a result, tilting of the attachment portion in the front-and-rear direction is suppressed and durability of the attachment portion to the front side member is improved. That is, durability of the attachment portion to the vehicle of the bumper portion at which the bumper guard is provided is improved.

In a vehicle front portion structure according to a second aspect of the present invention, the bumper portion, the bumper guard and the up-and-down extension portion are fabricated of metal.

According to the second aspect, because the bumper portion, the bumper guard and the up-and-down extension portion are fabricated of metal, weights thereof are higher than in a case of fabrication of resin. Therefore, it is easier for tilting in the front-and-rear direction of the attachment portion to the front side member to occur. However, because the protruding portion that protrudes upward of the bumper portion and the attachment portion to the front side member are made integral in the present invention, vibrations of the protruding portion in the front-and-rear direction relative to the attachment portion are suppressed, and tilting of the attachment portion in the front-and-rear direction is suppressed. Thus, even in a structure in which the attachment portion to the front side member is easier to tilt in the front-and-rear direction, tilting of the attachment portion in the front-and-rear direction may be suppressed. Therefore, durability of the attachment portion to the front side member may be effectively improved.

A vehicle front portion structure according to a third aspect of the present invention further includes: a brace, one end of which is connected to the bumper portion at a vehicle width direction outer side relative to the front side member, and another end of which is connected to a front side region of the front side member; and a reinforcing portion that is provided at the side of the brace at which the another end is disposed, and that restricts twisting deformation in the front-and-rear direction.

According to the third aspect, twisting of the another end of the brace in the front-and-rear direction is suppressed by the reinforcing portion. Therefore, tilting in the front-and-rear direction of the region of attachment between the front side member to which the another end of the brace is joined and the up-and-down extension portion may be suppressed, and durability of the attachment portion may be effectively improved.

A vehicle front portion structure according to a fourth aspect of the present invention further includes a reinforcing member, one end of which is connected to the crush box, and another end of which is connected to a front side region of the front side member.

According to the fourth aspect, a joining stiffness between the crush box and the front side member is raised by the reinforcing member. Thus, tilting in the front-and-rear direction relative to the front side member by the up-and-down extension portion, which is attached to the front side member via the crush box, is suppressed. Therefore, durability of the attachment portion to the front side member of the up-and-down extension portion may be effectively improved.

BRIEF DESCRIPTION OF THE DRAWINGS

Exemplary Embodiments of the present invention will be described in detail based on the following figures, wherein.

DETAILED DESCRIPTION

Figure 1:
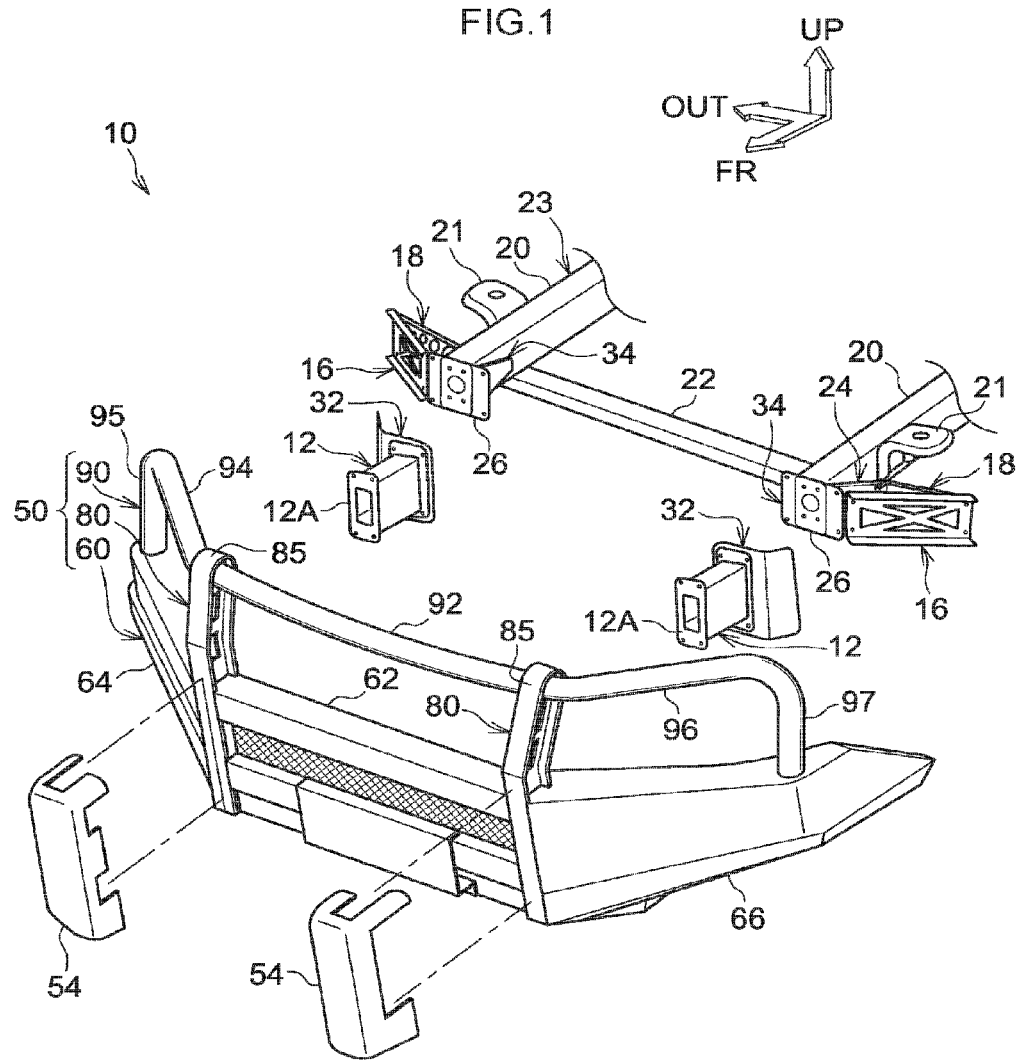
FIG. 1 is an exploded perspective view showing a vehicle front portion structure in accordance with a present exemplary embodiment.

Herebelow, an example of an embodiment relating to the present invention is described in accordance with the drawings. An arrow FR, an arrow UP and an arrow OUT that are shown where appropriate in the drawings indicate, respectively, a vehicle front side, a vehicle upper side and a vehicle width direction outer side. Herebelow, the front-and-rear direction of the vehicle, the left-and-right direction of the vehicle (the vehicle width direction) and the vehicle up-and-down direction may be referred to simply as, respectively, front and rear, left and right, and up and down.

Vehicle Front Portion Structure 10

First, structures of a vehicle front portion structure 10 according to the present exemplary embodiment are described. FIG. 1 shows the vehicle front portion structure 10. As shown in FIG. 1, the vehicle front portion structure 10 is provided with front side members 20, a front bumper 50, front braces 16 and rear braces 18 (an example of braces).

The front side members 20 are provided at the vehicle front side as a left and right pair at both sides in the vehicle width direction. Each front side member 20 extends in the vehicle front-and-rear direction. The front side member 20 is structured in, for example, a pipe shape with a rectangular cross section. In the case of a vehicle with a frame, the front side member 20 corresponds to a front side rail.

Figure 2:
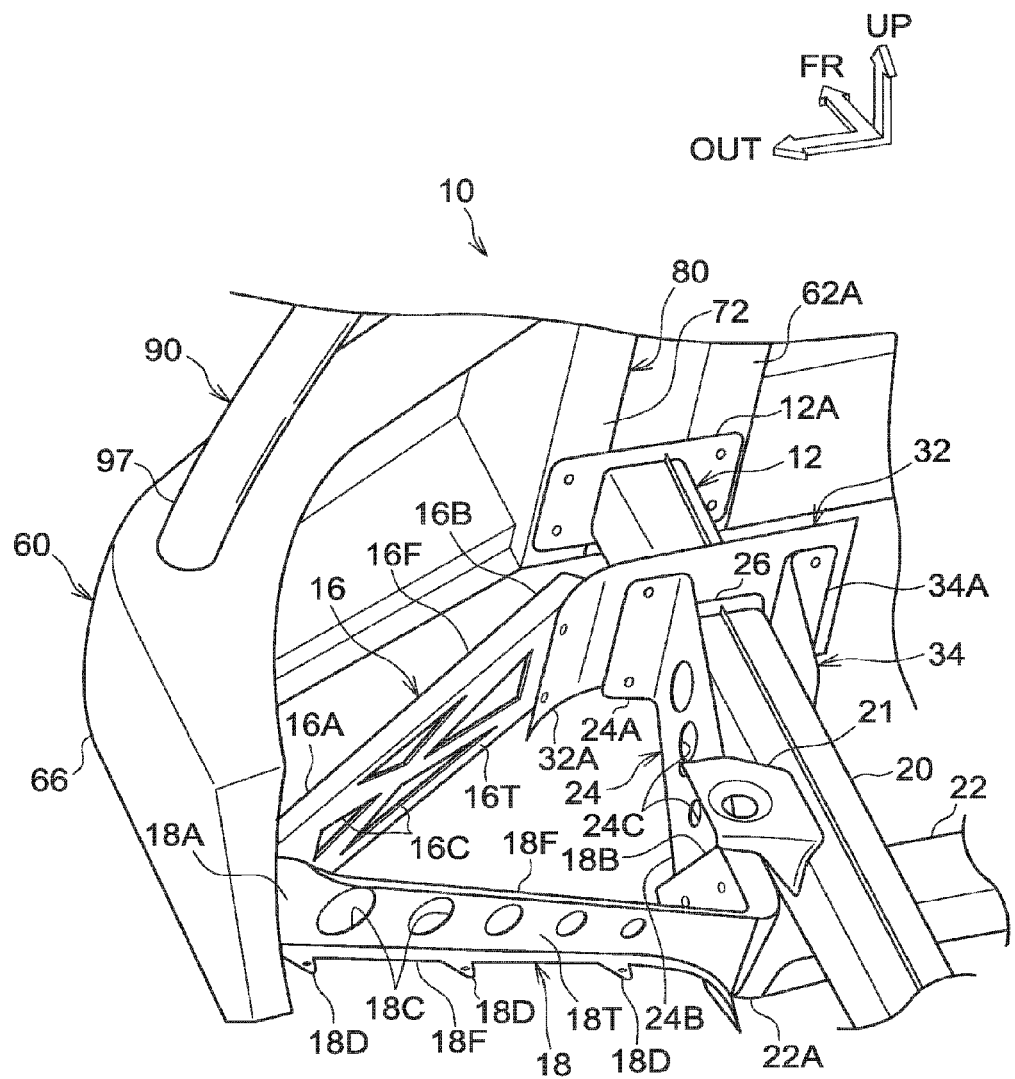
FIG. 2 is a perspective view showing the vehicle front portion structure in accordance with the present exemplary embodiment.

A cross-member 22 that extends in the vehicle width direction is connected to front side portions of the pair of front side members 20. As shown in FIG. 2, vehicle width direction end portions 22A of the cross-member 22 are disposed at the vehicle lower side of the front side members 20. Of a plural number of cross-members (not shown in the drawings), the cross-member 22 is the cross-member that is disposed furthest to the vehicle front side. Thus, in the present exemplary embodiment, a framework body 23 of the vehicle includes the pair of front side members 20 and the cross-member 22. At each front side member 20, for example, a body mount bracket 21 is provided at the location of the cross-member 22 in the vehicle front-and-rear direction.

Gusset plates 24 and 34 are disposed at a side face at the vehicle width direction outer side and a side face at the vehicle width direction inner side of a front end portion 26 of each front side member 20. The gusset plates 24 and 34 serve as an example of a reinforcing member. Flanges 24A and 34A are formed at front ends (one ends) of the gusset plates 24 and 34. The flanges 24A and 34A are for connecting a crush box 12 with the front side member 20. A rear end 24B (another end) of the gusset plate 24 is connected to the vehicle width direction end portion 22A of the cross-member 22. Because the end portion 22A is disposed at the vehicle lower side of the front side member 20, the gusset plate 24 is provided to be angled diagonally downward to the vehicle rear side in side view (see FIG. 4).

Because the cross-member 22 is connected to the front side portion of the front side member 20 as described above, the rear end 24B of the gusset plate 24 is connected to the front side portion of the front side member 20 indirectly, via the cross-member 22. However, the rear end 24B of the gusset plate 24 may be connected to the front side portion of the front side member 20 directly. A rear end 34B (another end) of the gusset plate 34 is connected to a side portion at the vehicle width direction inner side of the front side portion of the front side member 20.

Figure 3:
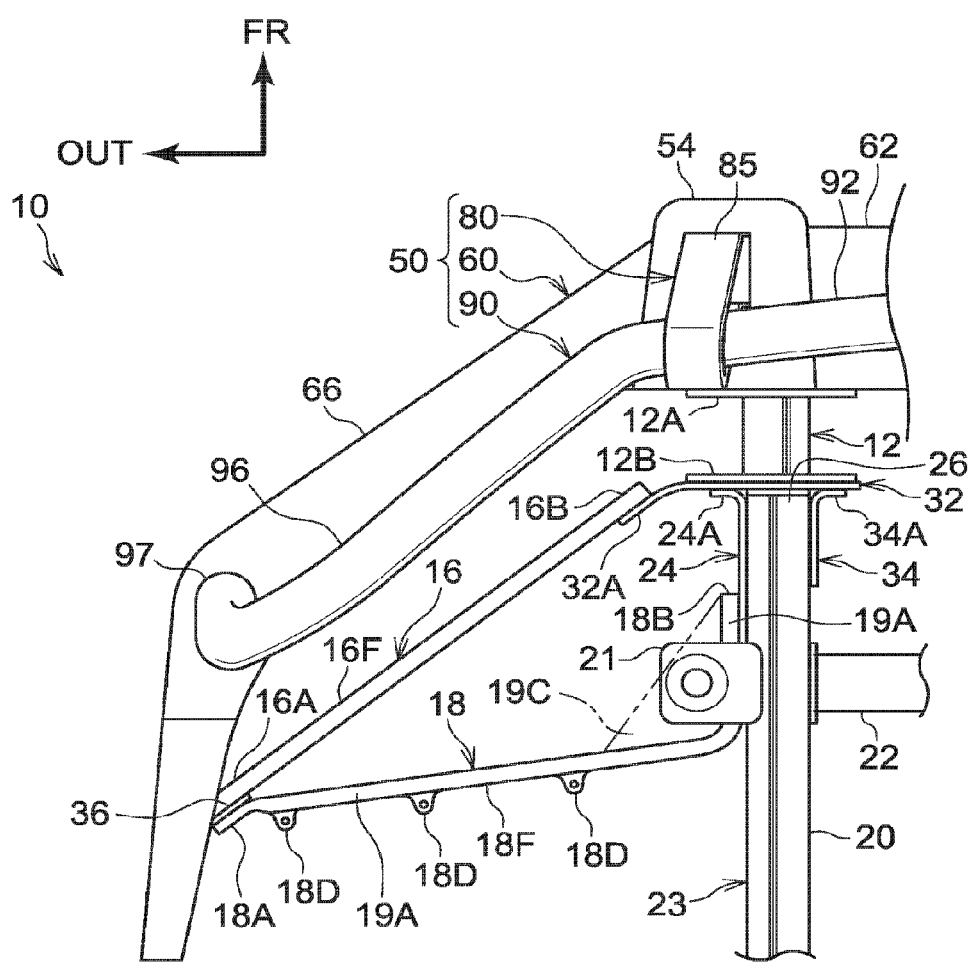
FIG. 3 is a plan view showing the vehicle front portion structure in accordance with the present exemplary embodiment.

As shown in FIG. 1, the crush boxes 12 are attached to the respective front end portions 26 of the left and right front side members 20. Each crush box 12 is structured so as to be compressively deformed more easily than the front side member 20 by a collision load inputted in the vehicle front-and-rear direction. As shown in FIG. 3, the crush box 12 includes a front flange 12A and a rear flange 12B. The crush box 12 is connected to the front end portion 26 of the front side member 20 at the rear flange 12B.

In the present exemplary embodiment, each front brace 16 is attached to an attachment plate 32. The attachment plate 32 is sandwiched between the rear flange 12B of the respective left or right crush box 12 and the respective flanges 24A and 34A of the gusset plates 24 and 34, and is fastened together therewith. That is, the flanges 24A and 34A (front ends) of the gusset plates 24 and 34 are connected to the rear flange 12B (rear end) of the crush box 12 in a state in which the flanges 24A and 34A sandwich the attachment plate 32 against the rear flange 12B. The attachment plate 32 projects further to the vehicle width direction outer side than the flange 24A; a projection portion 32A of the attachment plate 32 is inflected diagonally to the vehicle rear side.

In FIG. 2 and FIG. 3, one end 16A of the front brace 16 is attached to a bumper portion 60, which is described below, of the front bumper 50 at the vehicle width direction outer side relative to the front side member 20. Another end 16B of the front brace 16 is connected to the front end portion 26 of the front side member 20. The front brace 16 is, for example, a steel plate that is press-formed into a "U" shape in cross section, with a flange 16F being formed at each of a vehicle upper side vicinity and a vehicle lower side vicinity of an upright wall portion 16T. Each flange 16F protrudes to, for example, the vehicle front side. As an example, a plural number of lightening holes 16C are formed at the front brace 16. To be specific, four of the lightening holes 16C are formed, being formed in triangular shapes. Thus, the upright wall portion 16T includes an X-shaped portion. Because the upright wall portion 16T of the front brace 16 is formed with the "X" shape, twisting stiffness of the front brace 16 is raised. A vehicle up-and-down direction dimension (breadth dimension) of the front brace 16 may vary in a length direction of the front brace 16.

Figure 5:
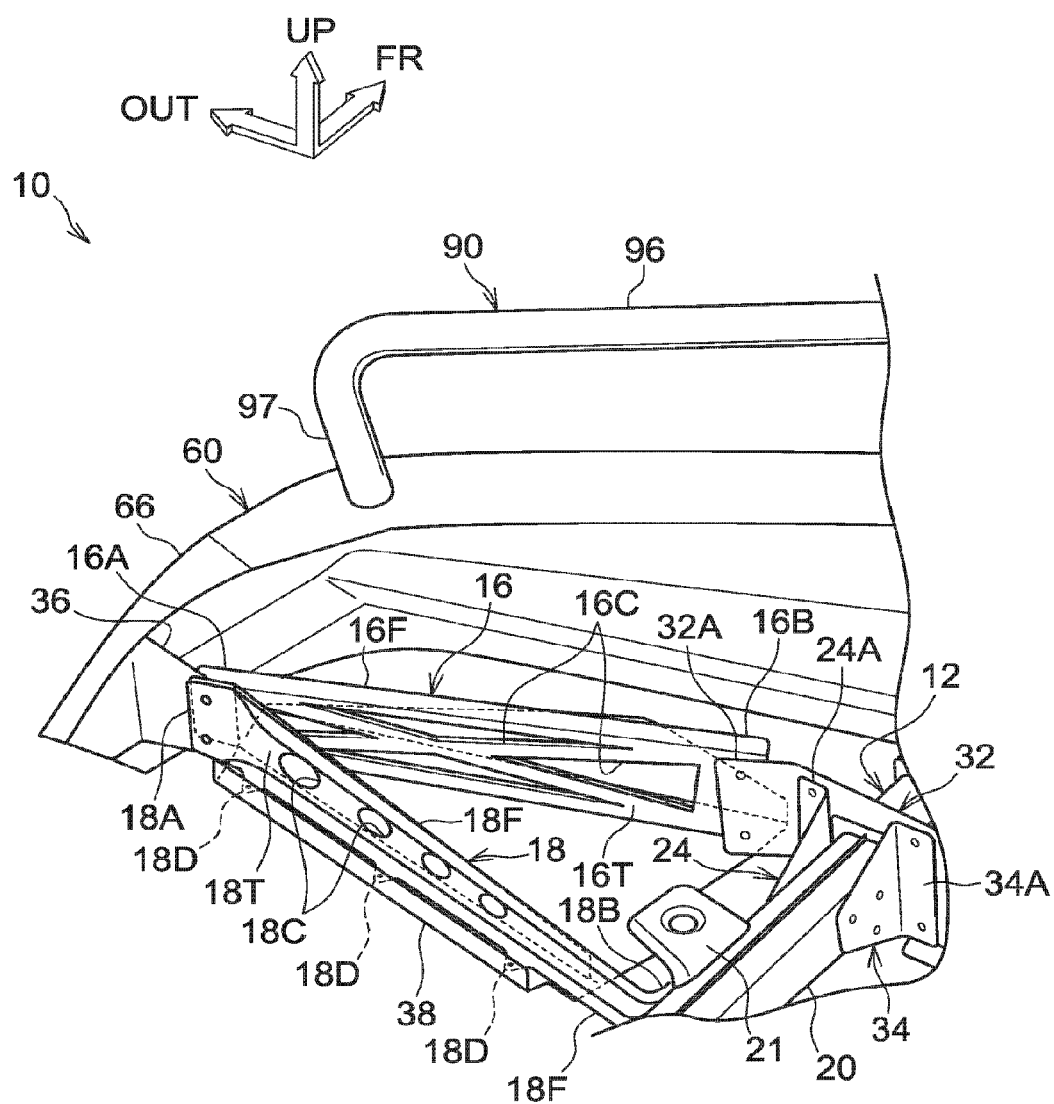
FIG. 5 is a perspective view showing the vehicle front portion structure in accordance with the present exemplary embodiment in a state in which an under cover is attached.

As shown in FIG. 3 and FIG. 5, an attachment portion 36 in, for example, a plate shape is provided at a rear face of the below-described bumper portion 60 of the front bumper 50. The one end 16A of the front brace 16 is connected to, to be specific, a front face side of the attachment portion 36. The another end 16B of the front brace 16 is connected to, to be specific, a front face side of the projection portion 32A of the attachment plate 32. The one end 16A and another end 16B of the front brace 16 are connected to the attachment portion 36 and the projection portion 32A, respectively, at plural numbers of points up and down (to be specific, pairs of points).

In FIG. 2 and FIG. 3, one end 18A of the rear brace 18 is attached to both the one end 16A of the front brace 16 and the below-described bumper portion 60 of the front bumper 50. Another end 18B of the rear brace 18 is connected to a front side region of the front side member 20 that is at the vehicle rear relative to the another end 16B of the front brace 16. The rear brace 18 is, for example, a steel plate that is press-formed into a "U" shape in cross section, with a flange 18F being formed at each of a vehicle upper side vicinity and a vehicle lower side vicinity of an upright wall portion 18T. Each flange 18F protrudes to, for example, the vehicle rear side. As an example, a plural number of lightening holes 18C are formed at the rear brace 18. A vehicle up-and-down direction dimension (breadth dimension) of the rear brace 18 may vary in a length direction of the rear brace 18.

The one end 18A of the rear brace 18 is connected to, to be specific, a rear face side of the attachment portion 36 of the bumper portion 60. That is, the one end 16A of the front brace 16, the one end 18A of the rear brace 18 and the attachment portion 36 are triply superposed and connected in a state in which the attachment portion 36 is sandwiched between the one ends 16A and 18A.

Figure 4:
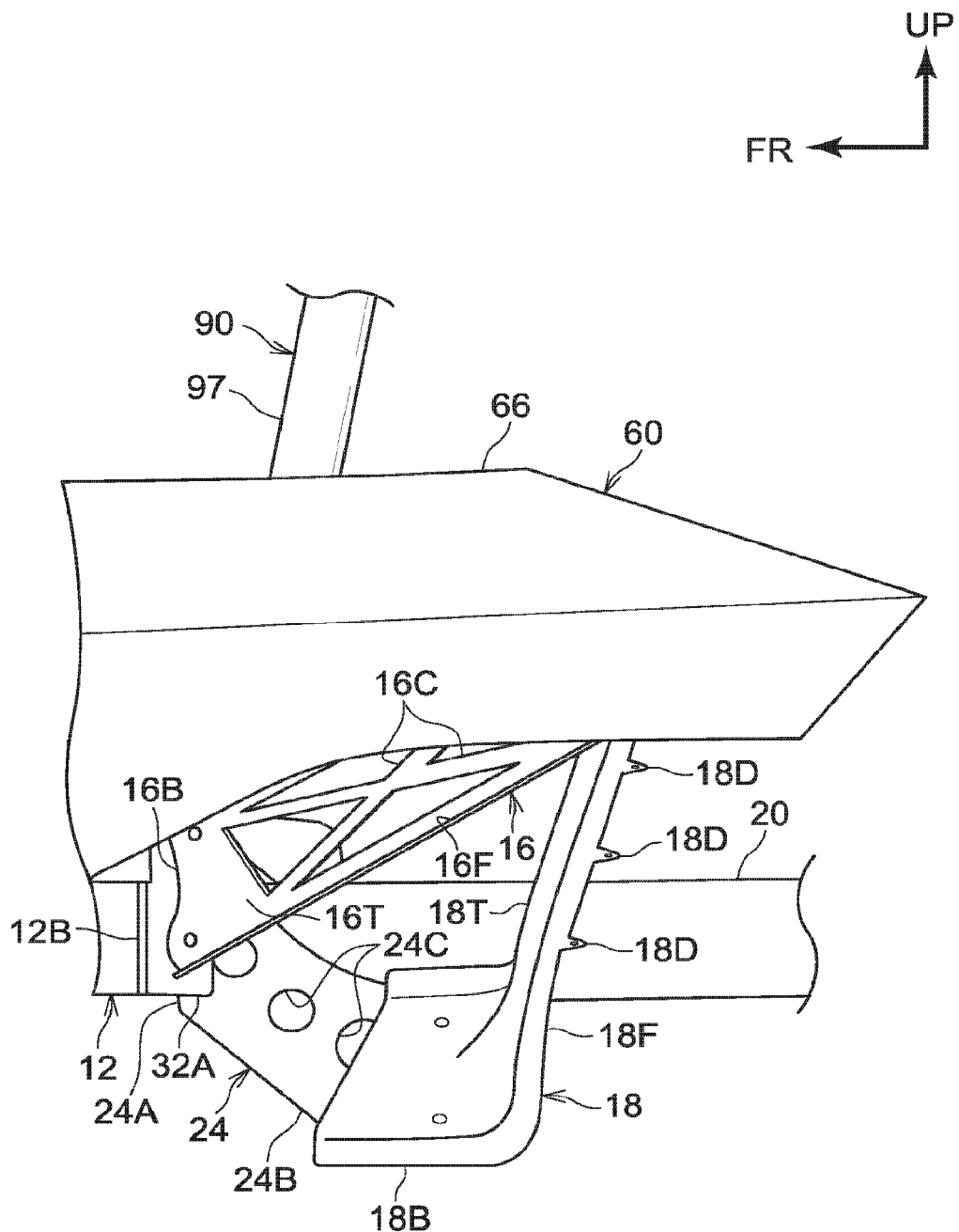
FIG. 4 is a side view showing the vehicle front portion structure in accordance with the present exemplary embodiment.

As shown in FIG. 2, FIG. 3 and FIG. 4, the another end 18B of the rear brace 18 is, for example, formed to be inflected to the vehicle front side and is connected to the rear end 24B of the gusset plate 24. The another end 18B of the rear brace 18 and the rear end 24B of the gusset plate 24 are together connected to the end portion 22A of the cross-member 22 in a state in which the another end 18B is superposed with the vehicle width direction outer side of the rear end 24B. The one end 18A and another end 18B of the rear brace 18 are connected to the attachment portion 36 and the gusset plate 24, respectively, at plural numbers of points up and down (to be specific, pairs of points).

Thus, the gusset plate 24 is connected between the another end 16B of the front brace 16 and the another end 18B of the rear brace 18. As an example, a plural number of lightening holes 24C are formed at the gusset plate 24. The another end 18B of the rear brace 18 is connected to the gusset plate 24 directly, but the another end 16B of the front brace 16 is connected to the gusset plate 24 via the attachment plate 32. Thus, the connection of the gusset plate 24 to the front brace 16 is an indirect connection. However, the another end 16B of the front brace 16 and the gusset plate 24 may be connected directly, and the connection between the another end 18B of the rear brace 18 and the gusset plate 24 may be an indirect connection.

Because the side of the rear brace 18 at which the another end 18B is provided is inflected toward the vehicle front side as described above, the rear brace 18 is formed in a substantial "L" shape in plan view, as shown in FIG. 3. The rear brace 18 includes, in plan view, a main body portion 19A that structures one length of the "L" shape and extends in the vehicle width direction, and a projection portion 19B that structures the other length of the "L" shape and protrudes to the vehicle front from an end portion at the vehicle width direction inner side of the main body portion 19A. Patches 19C may be provided between the end portion at the vehicle width direction inner side of the main body portion 19A and the projection portion 19B. The patches 19C are provided at each of a vehicle upper side edge and a vehicle lower side edge. The patches 19C serve as a reinforcing portion that restricts twisting deformation in the front-and-rear direction. Thus, a structure may be formed in which the patches 19C are provided to serve as the reinforcing portion at the side of the rear brace 18 at which the another end 18B is provided.

A plural number of attachment portions 18D are provided protruding to the vehicle rear from the flange 18F that is at the vehicle lower side of the rear brace 18. As shown in FIG. 5, an under cover 38 may be attached to the attachment portions 18D using, for example, clips (not shown in the drawings). The under cover 38 is formed in a triangular shape in plan view, and may cover the front brace 16 and the rear brace 18 from the vehicle lower side thereof. The meaning of the term "triangular shape" includes shapes that appear triangular overall.

In the present exemplary embodiment, as shown in FIG. 3, the one end 16A of the front brace 16 and the one end 18A of the rear brace 18 are disposed at the vehicle rear relative to the another end 18B of the rear brace 18. That is, the connection points between the one end 16A of the front brace 16 and the one end 18A of the rear brace 18 are disposed at the vehicle rear relative to connection points of the another end 18B of the rear brace 18 to the gusset plate 24 and the cross-member 22.

Thus, the front brace 16, the rear brace 18 and the front side member 20 (the gusset plate 24) form a triangular truss structure in plan view.

Meanwhile, as shown in FIG. 1, the front bumper 50 includes the bumper portion 60, a bumper guard 90, and a pair of upper and lower up-and-down extension portions 80. The bumper portion 60, the bumper guard 90 and the pair of up-and-down extension portions 80 are fabricated of metal; a weight thereof is, for example, 50 kg or more.

The bumper portion 60 is provided at the vehicle front side of the front side members 20 and extends in the vehicle width direction. To be specific, the bumper portion 60 includes a front portion 62 and side portions 64 and 66. The front portion 62 is disposed between the pair of up-and-down extension portions 80 in the vehicle width direction. The side portions 64 and 66 are disposed at the vehicle width direction outer sides of the up-and-down extension portions 80. The bumper portion 60 further includes covers 54 that are attached to each of the up-and-down extension portions 80 from the vehicle front thereof.

Figure 6:
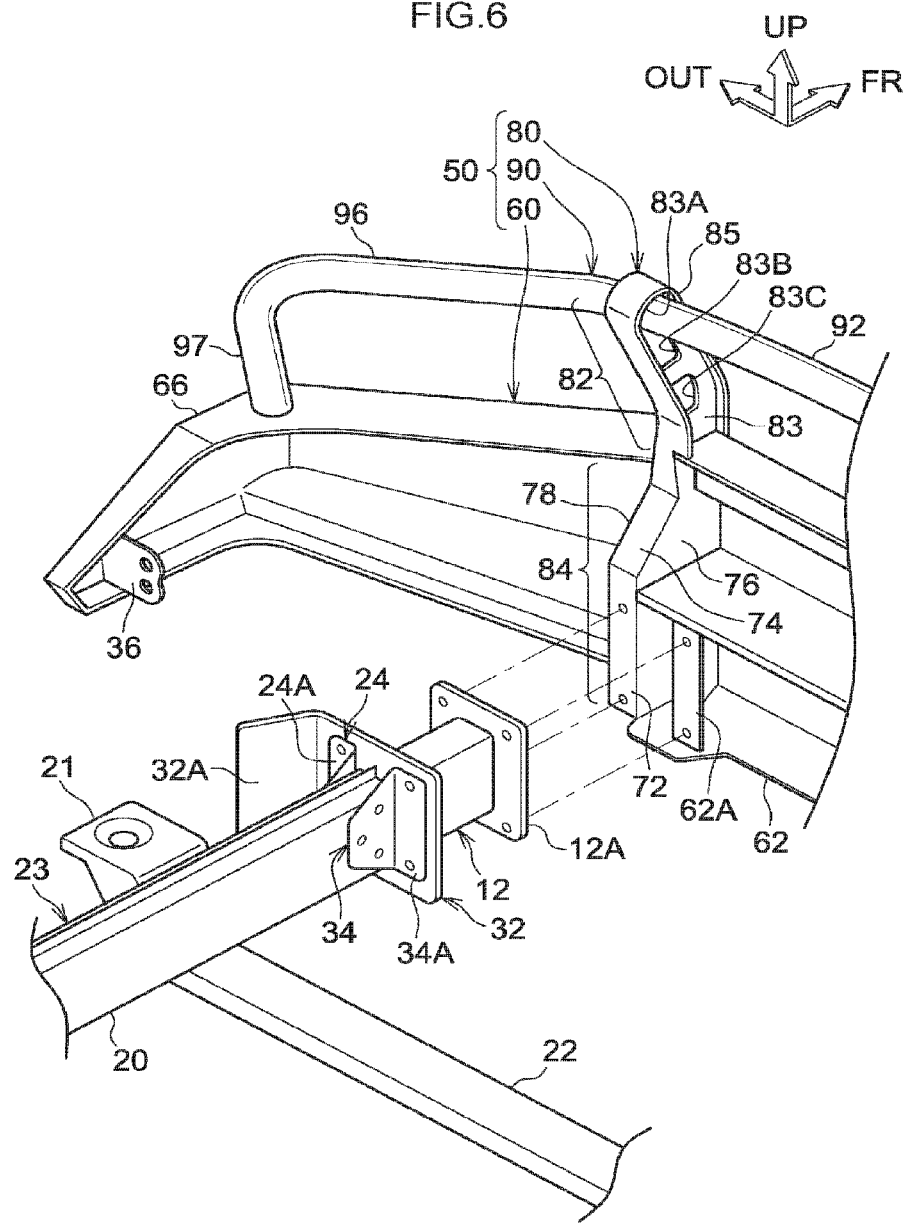
FIG. 6 is an exploded perspective view showing the vehicle front portion structure in accordance with the present exemplary embodiment.

The front portion 62 of the bumper portion 60 is structured by a plural number of panels. As shown in FIG. 6, attachment plates 62A are provided at lower portions of the front portion 62 in front of the crush boxes 12. Each attachment plate 62A serves as an attachment portion that is attached to the crush box 12. Similarly to the front portion 62, the side portions 64 and 66 are structured by plural numbers of panels. As shown in FIG. 3, end portions at vehicle width direction outer sides of the side portions 64 and 66 pass around to sideward of the front side members 20.

The bumper guard 90 is structured by a pipe in a pipe shape that is formed in a "U" shape in front view (see FIG. 1). The bumper guard 90 is a guard that functions as an animal bar. The bumper guard 90 is disposed at the vehicle upper side of the bumper portion 60.

To be specific, as shown in FIG. 1, the bumper guard 90 includes a front portion 92, side portions 94 and 96, and upright portions 95 and 97. The front portion 92 is disposed above the front portion 62 of the bumper portion 60 and extends in the vehicle width direction. The side portion 94 is disposed above the side portion 64 of the bumper portion 60. One end portion (a left end portion) of the side portion 94 is connected to a right end portion of the front portion 92; the side portion 94 extends diagonally rearward to the right from the right end portion of the front portion 92. The side portion 96 is disposed above the side portion 66 of the bumper portion 60. One end portion (a right end portion) of the side portion 96 is connected to a left end portion of the front portion 92; the side portion 96 extends diagonally rearward to the left from the left end portion of the front portion 92.

The upright portion 95 extends in the up-and-down direction. An upper end portion of the upright portion 95 is connected to another end portion (a right end portion) of the side portion 94. A lower end portion of the upright portion 95 is connected to a vehicle width direction outer side region of an upper face of the side portion 64 of the bumper portion 60.

The upright portion 97 extends in the up-and-down direction. An upper end portion of the upright portion 97 is connected to another end portion (a left end portion) of the side portion 96. A lower end portion of the upright portion 97 is connected to a vehicle width direction outer side region of an upper face of the side portion 66 of the bumper portion 60.

Figure 7:
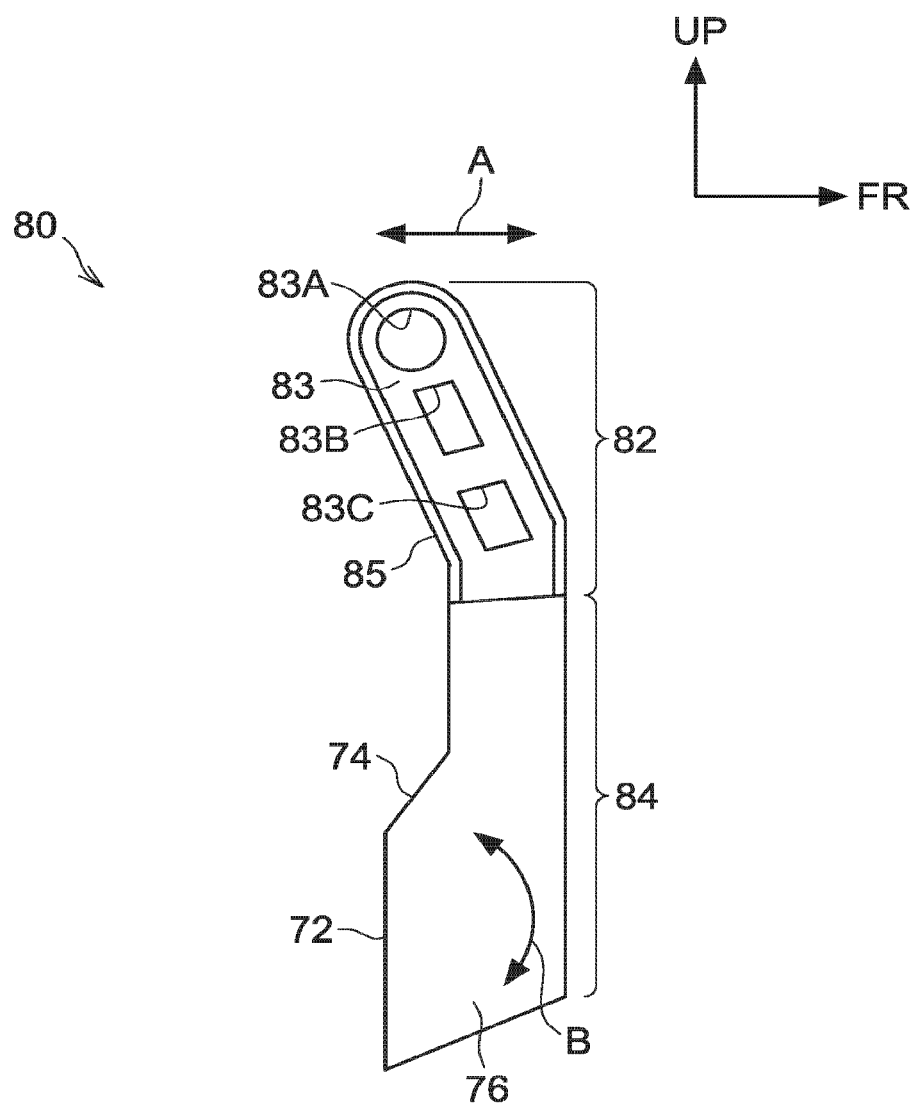
FIG. 7 is a side view showing an up-and-down extension portion in accordance with the present exemplary embodiment.

As shown in FIG. 6 and FIG. 7, each up-and-down extension portion 80 extends in the vehicle up-and-down direction. As shown in FIG. 6, an upper portion 82 of the up-and-down extension portion 80 protrudes upward relative to the front portion 62 and the side portions 64 and 66 of the bumper portion 60. The upper portion 82 is angled gradually to the rear side toward the upper side. The upper portion 82 includes a plate member 83 with thickness in the vehicle width direction and width in the front-and-rear direction.

The plate member 83 protrudes upward from the front portion 62 and the side portions 64 and 66 of the bumper portion 60. The plate member 83 is angled gradually to the rear side toward the upper side. As shown in FIG. 7, an outer edge of an upper end portion of the plate member 83 are formed in a circular arc shape in side view. A round hole 83A is formed at the upper end portion of the plate member 83, penetrating therethrough in the vehicle width direction. As shown in FIG. 6, the front portion 92 of the bumper guard 90 passes through this round hole 83A, and the bumper guard 90 is joined to the plate member 83 by welding or the like. Holes 83B and 83C with quadrilateral shapes are formed in the plate member 83 at the round hole 83A, penetrating through the plate member 83 in the vehicle width direction.

As shown in FIG. 7, a plate member 85 is disposed at the outer edge of the plate member 83 in side view, running along the outer edge. As shown in FIG. 1, at the front side of the plate member 83, the plate member 85 extends to the lower side relative to the upper sides of the front portion 62 and the side portions 64 and 66 of the bumper portion 60. As shown in FIG. 6, at the rear side of the plate member 83, the plate member 85 extends to the lower side relative to the upper sides of the front portion 62 and the side portions 64 and 66 of the bumper portion 60.

A lower portion 84 of the up-and-down extension portion 80 is disposed lower than the upper ends of the front portion 62 and the side portions 64 and 66 of the bumper portion 60. The lower portion 84 is joined to the bumper portion 60 by welding or the like. To be specific, the lower portion 84 includes panels 72, 74, 76 and 78, and lower portions of the plate member 85 described above. The lower portion 84 is constituted with a closed cross section structure by the panels 72, 74, 76 and 78 and the lower portions of the plate member 85.

To be specific, the panel 72 is disposed forward of the crush box 12, and is formed in a plate shape with thickness in the front-and-rear direction. The panel 72 is connected to the crush box 12; that is, the panel 72 functions as an attachment portion that is attached to the front side member 20 via the crush box 12. The panel 72 is disposed at the vehicle width direction outer side of the attachment plate 62A. A vehicle width direction outer side region of the front flange 12A of the crush box 12 is connected to the panel 72, and a vehicle width direction inner side region of the front flange 12A is connected to the attachment plate 62A.

The panel 74 protrudes upward from the upper end of the panel 72 so as to be angled to the front side. The panel 74 and the panel 72 structure a rear wall of the lower portion 84. The panels 76 and 78 are disposed at the two vehicle width direction sides of the panels 72 and 74. The panels 76 and 78 structure respective side walls of the lower portion 84. A lower portion of the plate member 85 (a portion at the front side of the plate member 83 that extends to the lower side relative to the upper ends of the front portion 62 and the side portions 64 and 66 of the bumper portion 60) structures a front wall of the lower portion 84.

The connection means and attachment means of the respective members described above may employ, for example, bolt fastening. However, various means such as pin joins, riveting, welding, adhesion, tight fitting, engagement and the like may be employed.

Operational Effects of the Present Exemplary Embodiment

Now, operational effects of the present exemplary embodiment are described.

According to the vehicle front portion structure 10 of the present exemplary embodiment, the lower portion 84 of each up-and-down extension portion 80 is attached to the respective front side member 20 via the crush box 12. Therefore, if the vehicle vibrates up and down in accordance with running, the vibrations are inputted from the front side member 20 to the up-and-down extension portion 80 via the crush box 12.

When vibrations up and down are inputted to the up-and-down extension portion 80, the upper portion 82 of the up-and-down extension portion 80, which is the portion protruding upward of the bumper portion 60, and the bumper guard 90 act to vibrate in the front-and-rear direction (the direction of arrow A in FIG. 7). If the upper portion 82 of the up-and-down extension portion 80 and the bumper guard 90 vibrate in the front-and-rear direction, the bumper portion 60 and the lower portion 84 of the up-and-down extension portion 80 are subject to tilting in the front-and-rear direction, and a bending moment (see arrow B in FIG. 7) is produced at the attachment portion to the front side member 20 (the lower portion 84 and the attachment plate 62A).

However, in the present exemplary embodiment, each up-and-down extension portion 80 includes the protruding portion that protrudes upward of the bumper portion 60 (the upper portion 82) and the attachment portion to the front side member 20 (the lower portion 84). Thus, the protruding portion and the attachment portion are made integral. Therefore, even if vibrations up and down are inputted in accordance with running of the vehicle, vibrations of the protruding portion in the front-and-rear direction relative to the attachment portion are suppressed.

Hence, tilting of the attachment portion in the front-and-rear direction is suppressed and durability of the attachment portion to the front side member 20 is improved. That is, durability of the attachment portion to the vehicle of the bumper portion 60 at which the bumper guard 90 is provided is improved.

In the present exemplary embodiment, because the bumper portion 60, the bumper guard 90 and the up-and-down extension portion 80 are fabricated of metal, weights thereof are higher than in a case of fabrication of resin. Therefore, it is easier for tilting in the front-and-rear direction of the attachment portion to the front side member 20 (the lower portion 84 and the attachment plate 62A) to occur. However, in the present exemplary embodiment as described above, because the protruding portion that protrudes upward of the bumper portion 60 and the attachment portion to the front side member 20 are made integral, vibrations of the protruding portion in the front-and-rear direction relative to the attachment portion are suppressed, and tilting of the attachment portion in the front-and-rear direction is suppressed. Thus, even in the structure in which the attachment portion to the front side member 20 is easier to tilt in the front-and-rear direction, tilting of the attachment portion in the front-and-rear direction is suppressed. Therefore, durability of the attachment portion to the front side member 20 may be effectively improved.

When a bending moment is produced at the attachment portion to the front side member 20 (the lower portion 84 and the attachment plate 62A), twisting in the front-and-rear direction is produced at the another end 16B of the front brace 16 and the another end 18B of the rear brace 18 that are connected to the front side portion of the front side member 20.

However, in the present exemplary embodiment, the front brace 16 includes the upright wall portion 16T that is an X-shaped portion. Accordingly, the X-shaped portion functions as a brace. Thus, twisting of the another end 16B of the front brace 16 in the front-and-rear direction may be suppressed compared to a structure in which the upright wall portion 16T is formed linearly along the up-and-down direction or the vehicle width direction.

The one end 16A and another end 16B of the front brace 16 and the one end 18A and another end 18B of the rear brace 18 are respectively connected to connection objects such as the bumper portion 60, the front side member 20 and the like at plural points up and down. Consequently, twisting of the front brace 16 and the rear brace 18 in the front-and-rear direction may be suppressed.

In the structure in which, as shown in FIG. 3, the patches 19C that serve as the reinforcing portion are provided at the rear brace 18 at each of the vehicle upper side edge and the vehicle lower side edge, between the vehicle width direction inner side end portion of the main body portion 19A and the projection portion 19B, twisting of the another end 18B of the rear brace 18 in the front-and-rear direction may be suppressed.

Thus, because twisting of the another end 16B of the front brace 16 and the another end 18B of the rear brace 18 in the front-and-rear direction is suppressed, tilting in the front-and-rear direction of the attachment portion to the front side member 20 (the lower portion 84 and the attachment plate 62A) may be suppressed. Thus, durability of the attachment portion to the front side member 20 may be improved.

In the present exemplary embodiment, the flanges 24A and 34A (front ends) of the gusset plates 24 and 34 that serve as the reinforcing member are connected to the crush box 12, and the rear ends 24B and 34B of the gusset plates 24 and 34 are connected to the front side portion of the front side member 20.

Therefore, compared to a structure that does not include the gusset plates 24 and 34, a joining stiffness between the crush box 12 and the front side member 20 is raised. Thus, tilting of the up-and-down extension portion 80 that is attached to the front side member 20 via the crush box 12 in the front-and-rear direction relative to the front side member 20 is suppressed. As a result, durability of the attachment portion to the front side member 20 of the up-and-down extension portion 80 may be effectively improved.

The present invention is not limited by the exemplary embodiment described above; numerous modifications, alterations and improvements are possible within a technical scope not departing from the gist of the invention.

What is claimed is:

1. A vehicle front portion structure comprising:
   a front side member that extends in a vehicle front-and-rear direction;
   a bumper portion that is provided at the vehicle front side of the front side member and extends in the vehicle width direction;
   a bumper guard that is formed in a pipe shape, and that is provided at the vehicle upper side of the bumper portion; and
   an up-and-down extension portion that extends in a vehicle up-and-down direction, a lower portion of the up-and-down extension portion being joined to the bumper portion, directly contacting a crush box, and being attached to the front side member via the crush box, and an upper portion of the up-and-down extension portion protruding upward of the bumper portion and being connected to the bumper guard,
   wherein the up-and-down extension portion spanning from a lower portion of the bumper portion to an upper portion of the bumper portion, and extending toward the bumper guard beyond the upper portion of the bumper portion, and
   wherein the upper portion and the lower portion of the up-and-down extension portion are integrally formed.

2. The vehicle front portion structure according to claim 1, wherein the bumper portion, the bumper guard and the up-and-down extension portion are fabricated of metal.

3. The vehicle front portion structure according to claim 1, further comprising:
   a brace, one end of which is connected to the bumper portion at a vehicle width direction outer side relative to the front side member, and another end of which is connected to a front side region of the front side member; and
   a reinforcing portion that is provided at the side of the brace at which the another end is disposed, and that restricts twisting deformation in the front-and-rear direction.

4. The vehicle front portion structure according to claim 1, further comprising a reinforcing member, one end of which is connected to the crush box, and another end of which is connected to a front side region of the front side member.

5. The vehicle front portion structure according to claim 1, wherein the bumper portion includes a cover that is attached to the up-and-down extension portion from a vehicle front thereof.

6. The vehicle front portion structure according to claim 1, wherein the upper portion of the up-and-down extension portion is angled gradually to a rear side toward a upper side thereof.

7. The vehicle front portion structure according to claim 1, wherein the upper portion of the up-and-down extension portion includes a plate member with a thickness in the vehicle width direction and a width in the front-and-rear direction.

8. The vehicle front portion structure according to claim 7, wherein a round hole is formed at an upper end portion of the plate member, the round hole penetrating therethrough in the vehicle width direction, and wherein a front portion of the bumper guard passes through the round hole.

9. The vehicle front portion structure according to claim 1, wherein the lower portion of the up-and-down extension portion includes a panel that is formed in a plate shape with thickness in the vehicle front-and-rear direction, the panel being disposed in front of the crush box and connected to the crush box.

* * * * *